(12) United States Patent
Pepper et al.

(10) Patent No.: US 8,243,760 B2
(45) Date of Patent: Aug. 14, 2012

(54) SCHEDULER USING A PLURALITY OF SLOW TIMERS

(75) Inventors: Gerald Pepper, Newbury Park, CA (US); Brian Wilson, Encino, CA (US); John Dalmau, Simi Valley, CA (US)

(73) Assignee: Ixia, Calabasas, CA (US)

( * ) Notice: Subject to any disclaimer, the term of this patent is extended or adjusted under 35 U.S.C. 154(b) by 377 days.

(21) Appl. No.: 12/496,415

(22) Filed: Jul. 1, 2009

(65) Prior Publication Data

US 2011/0002228 A1    Jan. 6, 2011

(51) Int. Cl.
*H04J 3/06* (2006.01)
(52) U.S. Cl. .................. 370/508; 370/250; 370/252
(58) Field of Classification Search .................. 370/250, 370/252, 395.4, 508
See application file for complete search history.

(56) References Cited

U.S. PATENT DOCUMENTS

| | | | |
|---|---|---|---|
| 6,028,847 A | 2/2000 | Beanland | |
| 6,044,091 A | 3/2000 | Kim | |
| 6,091,740 A * | 7/2000 | Karasawa | 370/458 |
| 6,728,253 B1 | 4/2004 | Jeffries et al. | |
| 6,789,100 B2 | 9/2004 | Nemirovsky | |
| 6,950,405 B2 | 9/2005 | Van Gerrevink | |
| 7,769,049 B2 * | 8/2010 | Pepper et al. | 370/474 |
| 2001/0016023 A1 * | 8/2001 | Roy et al. | 375/372 |
| 2002/0037008 A1 | 3/2002 | Tagami | |
| 2002/0136230 A1 * | 9/2002 | Dell et al. | 370/416 |
| 2003/0165116 A1 * | 9/2003 | Fallon et al. | 370/230.1 |
| 2004/0177142 A1 * | 9/2004 | Pepper | 709/224 |

\* cited by examiner

*Primary Examiner* — David Oveissi
(74) *Attorney, Agent, or Firm* — SoCal IP Law Group LLP; Steven C. Sereboff; John E. Gunther (57) ABSTRACT

There is disclosed a scheduler for a traffic generator and a method of scheduling traffic. A working memory may stores N respective timer values for N count-down timers, where N is an integer greater than one. An arithmetic and logic unit (ALU) may update each timer value in rotation every N cycles of a clock. A temporal interpolator may delay output data from the ALU by a selectable delay period of 1 to N cycles of the clock.

18 Claims, 9 Drawing Sheets

SCHEDULER USING A PLURALITY OF SLOW TIMERS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating traffic for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. In order to test a packet switched network or a device included in a communications network, it is often desirable to generate network traffic having a data rate equal to the line rate or maximum possible data rate of the network communication path or device.

A series of packets originating from a single source and having a specific type of packet and a specific rate will be referred to herein as a "stream." A source may be, for example, a port on a network interface. A source may support multiple outgoing streams simultaneously and concurrently, for example to accommodate multiple packet types or rates. "Simultaneously" means "at exactly the same time." "Concurrently" means "within the same time."

For the purpose of reporting network traffic data, the packets within a stream may be organized into flows, where a "flow" is any plurality of data units for which network traffic statistics are accumulated and reported. The data units in a given flow may be distinguished by a flow identifier contained in each data unit. The flow identifier may be, for example, an address, a port number, a tag, or some other field or combination of fields within each data unit.

A plurality of concurrent streams may be combined to form the output from a traffic generator, which will be referred to herein as "test traffic". The streams within the traffic may be combined through interleaving. The interleaving may be balanced, unbalanced, and distributed among the represented streams. The data rate of the test traffic may be equal to the line rate of a network communication path over which the output is transmitted. Although the packets within a given stream may be transmitted at the line rate, the average data rate of each stream over time may be much lower, since a plurality of interleaved streams may share the data rate of the test traffic. To test a modern "triple play" network and network equipment, the test traffic may contain simulated data, audio, and video streams.

Throughout this description, elements appearing in block diagrams are assigned three-digit reference designators, where the most significant digit is the figure number and the two least significant digits are specific to the element. An element that is not described in conjunction with a block diagram may be presumed to have the same characteristics and function as a previously-described element having a reference designator with the same least significant digits.

In block diagrams, arrow-terminated lines may indicate data paths rather than signals. Each data path may be multiple bits in width. For example, each data path may consist of 4, 8, 16, 32, 64, or more parallel connections.

DETAILED DESCRIPTION

Description of Apparatus

Figure 1:
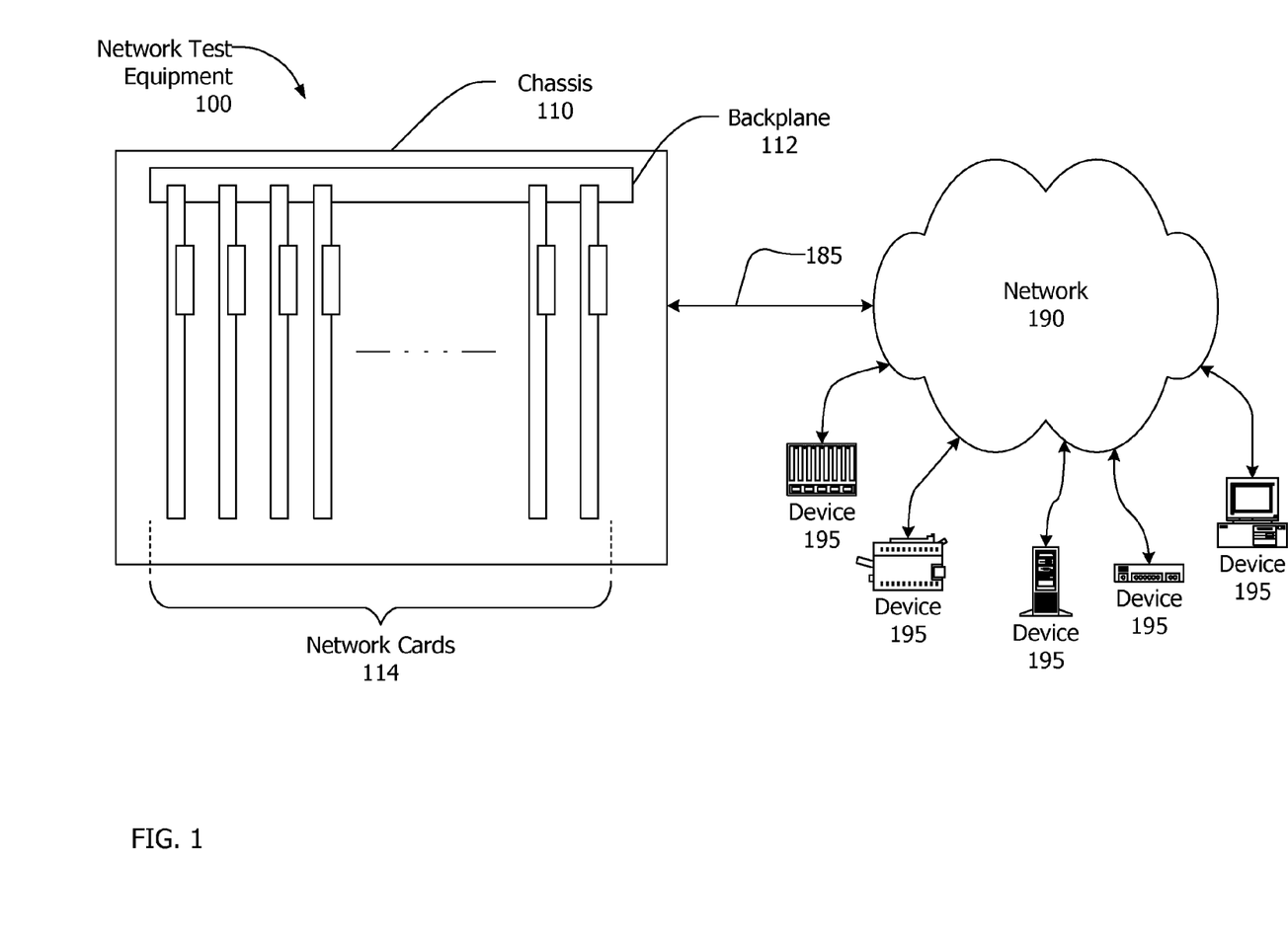
FIG. 1 is a block diagram of a network environment.

Referring now to FIG. 1, there is shown a block diagram of a network environment. The environment may include network test equipment 100, a network 190 and plural network devices 195.

The network test equipment 100 may be a network testing device, performance analyzer, conformance validation system, network analyzer, or network management system. The network test equipment 100 may include one or more network cards 114 and a backplane 112 contained or enclosed within a chassis 110. The chassis 110 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 114 may support one or more well known standards or protocols such as the various Ethernet and Fibre Channel standards, and may support proprietary protocols as well.

The network cards 114 may include one or more field programmable gate arrays (FPGAs), application specific integrated circuits (ASICs), programmable logic devices (PLDs), programmable logic arrays (PLAs), processors and other kinds of devices. In addition, the network cards 114 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 114 may provide one or more network ports. The ports of the network cards 114 may be connected to the network through a communication medium 185, which may be a wire, an optical fiber, a wireless link, or other communication medium. Each network card 114 may support a single communications protocol, may support a number of related protocols, or may support a number of unrelated protocols. The network cards 114 may be permanently installed in the network test equipment 100 or may be removable.

The backplane 112 may serve as a bus or communications medium for the network cards 114. The backplane 112 may also provide power to the network cards 120.

The network devices 195 may be any devices capable of communicating over the network 190. The network devices 195 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, and multiplexers. In addition, the network devices 195 may include appliances, alarm systems, and any other device or system capable of communicating over a network.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network test equipment 100 and the network devices 195 may communicate simultaneously with one another, and there may be plural logical communications between the network test equipment 100 and a given network device 195. The network itself may be comprised of numerous nodes providing numerous physical and logical paths for data to travel.

Figure 2:
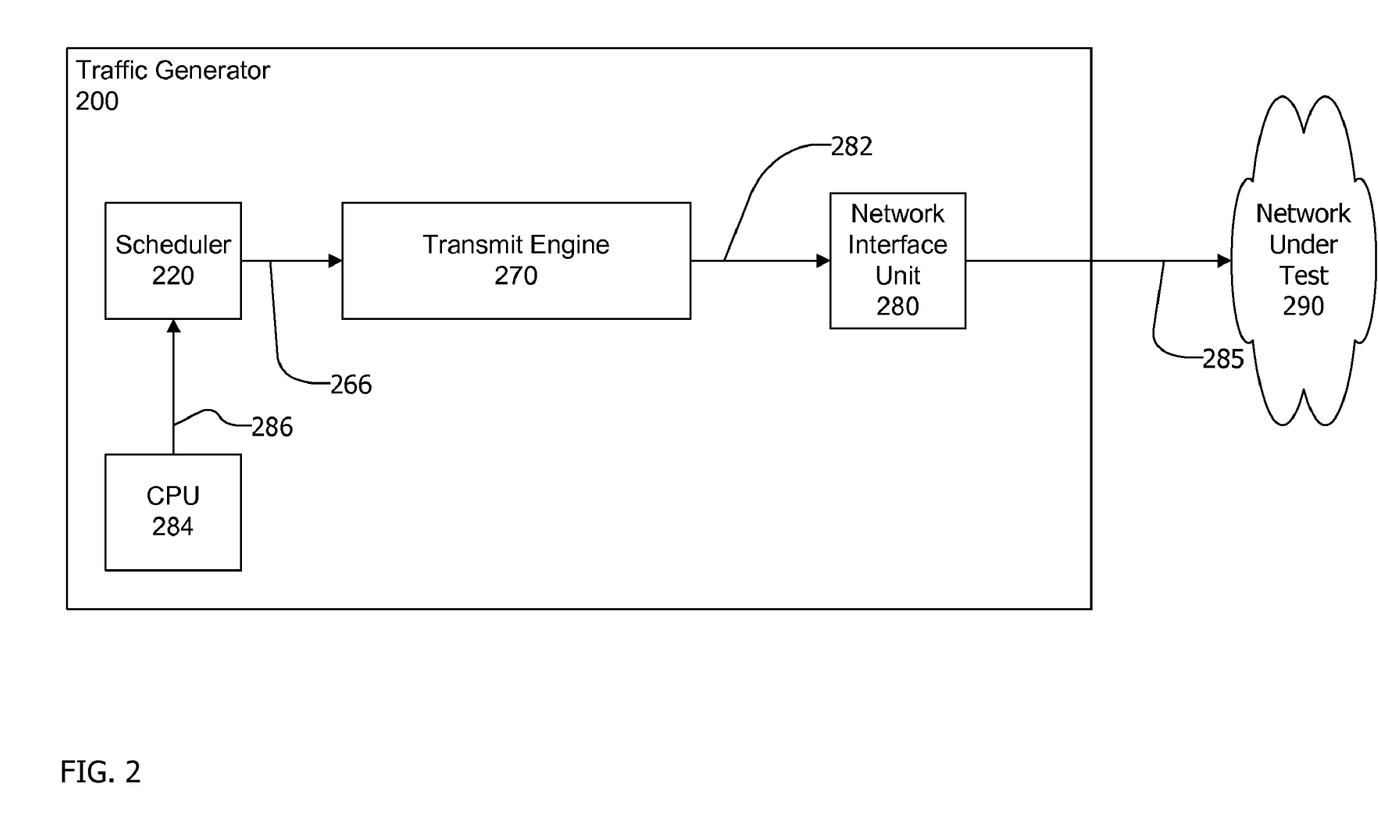
FIG. 2 is a block diagram of a traffic generator.

Referring now to FIG. 2, an exemplary traffic generator 200 may include a scheduler 220, at least one transmit engine 270, a network interface unit 280, and a central processing unit (CPU) 284. The exemplary traffic generator 200 may be all or a portion of a network card 114 as shown in FIG. 1.

Within this description, the term "engine" means a collection of hardware, which may be augmented by firmware and/or software, that performs the described functions. An engine may typically be designed using a hardware description language (HDL) that defines the engine primarily in functional terms. The HDL design may be verified using an HDL simulation tool. The verified HDL design may then be converted into a gate netlist or other physical description of the engine in a process commonly termed "synthesis". The synthesis may be performed automatically using a synthesis tool. The gate netlist or other physical description may be further converted into programming code for implementing the engine in a programmable device such as a field programmable gate array (FPGA), a programmable logic device (PLD), or a programmable logic arrays (PLA). The gate netlist or other physical description may be converted into process instructions and masks for fabricating the engine within an application specific integrated circuit (ASIC).

Within this description, the term "unit" also means a collection of hardware, firmware, and/or software, which may be on a larger scale than an "engine". For example, a unit may contain multiple engines, some of which may perform similar functions in parallel. The terms "engine" and "unit" do not imply any physical separation or demarcation. All or portions of one or more units and/or engines may be collocated on a common card, such as a network card 114, or within a common FPGA, ASIC, or other circuit device.

The CPU 284 may provide the scheduler 220 with instructions 286 to form a plurality of streams that may be interleaved to form test traffic 282. Each of the streams may include a sequence of packets. The packets within each stream may be of the same general type but may vary in length and content. The scheduler 220 may perform multiple functions including scheduling the sequence of packets to be generated and determining the length and variable content for each packet.

The scheduler 220 may pass packet forming data 266 required to generate each packet to the transmit engine 270. The packet forming data 266 passed from the scheduler 220 to the transmit engine 270 may include a stream identifier which identifies the type of packet, a packet length, variable data to be incorporated into the packet, and instructions for filling the packet payload.

The network interface unit 280 may convert the test traffic 282 from the transmit engine 270 into the electrical, optical, or wireless signal format required to transmit the data flow to the network under test 290 via a link 285, which may be a wire, an optical fiber, a wireless link, or other communication link.

The CPU 284 may include a processor, a memory coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The scheduler 220, the transmit engine 270, the CPU 284, and the network interface unit 280 may include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The physical partitioning of the components of the traffic generator 200 may be different from the functional partitioning shown in FIG. 2, such that a given functional component or block may be divided between two or more circuit devices and a single circuit device may contain all or portions of two or more functional components or all functional components.

The data flow to the network over the link 285 may have a maximum data rate, commonly termed the "line rate". The data flow over the link 285 may use encoding to facilitate transmission. The encoding may cause the line rate and the actual clock rate for the data to be different. For example, the actual clock rate of a 10 GHz link using 64 bit to 66 bit encoding may be 10.3125 GHz. Although the data rate through the traffic generator may be the same as the line rate, the data paths between the various functional blocks may transmit multiple bits in parallel such that the actual clock rate within the functional blocks may be less than the line rate. For example, a traffic generator with a 10 GHz line rate may process 50 bits in parallel and have an internal clock rate of about 200 MHz.

Figure 3:
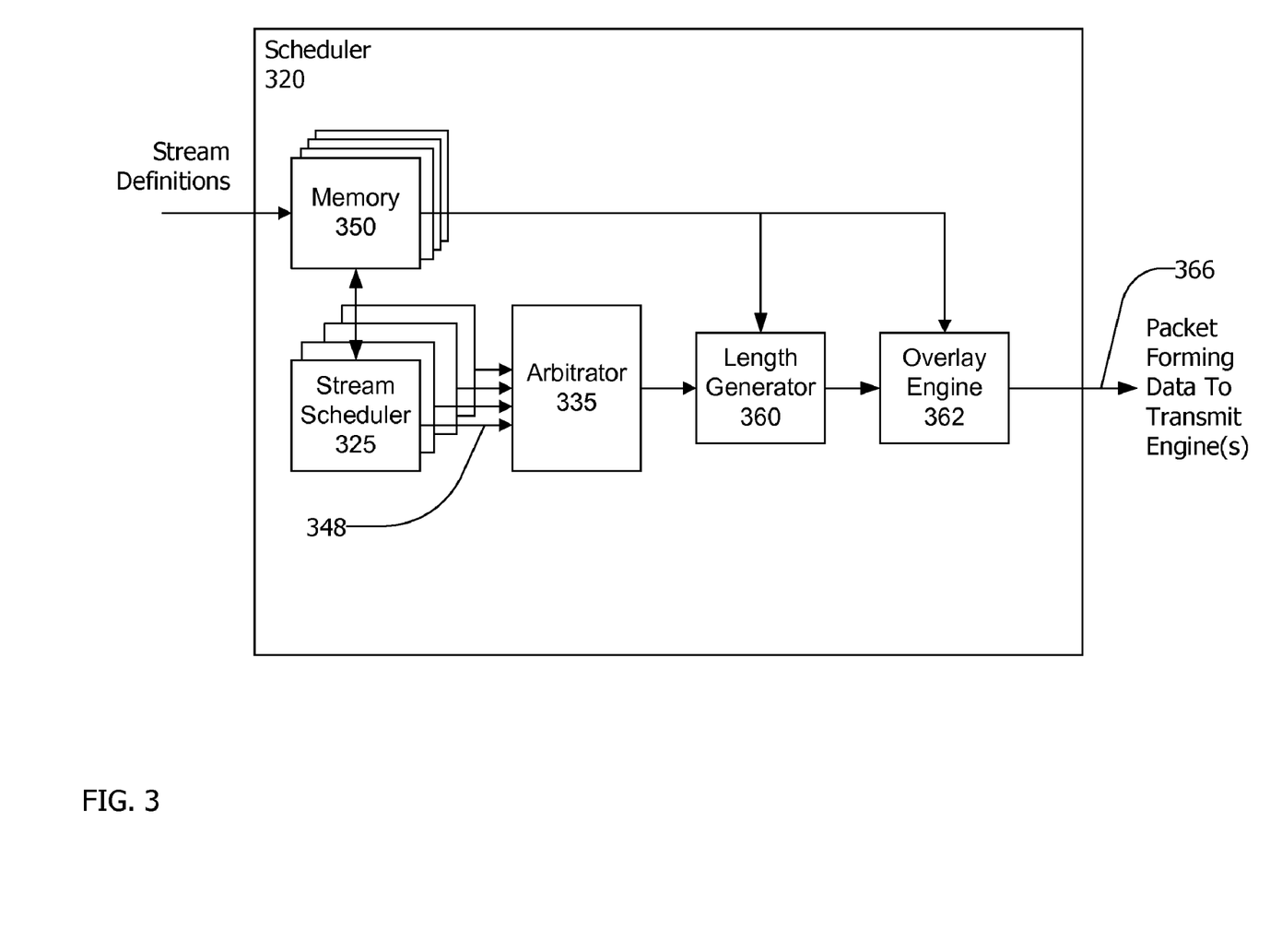
FIG. 3 is a block diagram of an exemplary scheduler.

FIG. 3 shows a functional block diagram of an exemplary scheduler 320, which may be suitable for the scheduler 220 in FIG. 2. The exemplary scheduler 320 may include one or more memory 350 to store a plurality of stream definitions, one or more stream schedulers 325, a length generator 360, and an overlay engine 362.

The memory 350 may be loaded with the definitions of a plurality of streams that constitute a testing session. The memory may be loaded from the CPU 284 shown in FIG. 2, or may be loaded from another computer (not shown) which may direct and monitor network tests. The definition of each of the plurality of streams may include data defining the stream type such as TCP/IP, UDP/IP, or other type of stream. The definition of each of the plurality of streams may also include instructions for setting various fields, such as address fields, within each packet of the stream, instructions for setting the length of each packet in the stream, and instructions for filling the body of the packets. The memory 350 may also be loaded with timing information required for the stream scheduler to schedule the packets comprising each stream at the appropriate time intervals. The definition of each of the plurality of streams may include other data and instructions.

The memory 350 may be dynamic random access memory (DRAM) or static random access memory (SRAM). The memory 350 may be implemented within an ASIC, FPGA or other circuit device containing all or portions of the stream scheduler 325, the length generator 360, and the overlay engine 362. The memory 350 may be implemented wholly or partially with DRAM or SRAM memory chips external to the ASIC, FPGA or other device.

The stream scheduler 325 may generate next packet data 348 defining the next packet to be formed by first determining the next stream to contribute a packet to the test traffic based on the stream definitions and timing information stored in the memory 350. When a large number of streams must be scheduled, the scheduler 320 may include a plurality of parallel stream schedulers 325. Although FIG. 3 shows four parallel stream schedulers, the number of stream schedulers in a scheduler may be less than or greater than four. When a scheduler includes a plurality of stream schedulers, the memory 350 may be divided into banks corresponding to the stream schedulers. When a scheduler includes a plurality of stream schedulers, an arbitrator 335 may be used to resolve conflicts when two or more streams are scheduled to transmit packets simultaneously. The arbitrator 335 may include priority logic that resolves conflicts in a fair manner that prevents one or more stream scheduler from monopolizing the capacity of the scheduler. For example, the arbitrator 335 may include logic that resolves conflicts by awarding priority to the stream scheduler that least recently initiated generation of a packet.

After the stream scheduler 325 or arbitrator 334 has identified the next stream and the next packet to be formed, the length generator 360 may establish the length of the next packet. The length of the next packet may be constant within the stream, may be random, may be calculated by adding a predetermined constant to the length of the previous packet in the stream, or may be established in some other manner.

After the stream scheduler 325 has identified the next stream to be formed, the overlay engine 362 may establish overlay data for the next packet. The overlay engine 362 may determine the overlay data concurrently or after the length generator 360 determines the packet length. The overlay data may be any data that is not constant between packets of the next stream. The overlay data may be established by calculation, such as by adding a predetermined number to the corresponding data of the previous packet in the stream. The overlay data may also be determined randomly, may be determined from a table of stored values, or may be determined in some other manner as instructed by the stream definition for the next packet. One or more fields of overlay data may be established for each packet. Each field of overlay data may be established in a different manner.

The overlay engine 362 may provide packet forming data 366 to the transmit engine or transmit engines. The packet forming data may include length data, overlay data, and other information necessary to form the packet.

Figure 4:
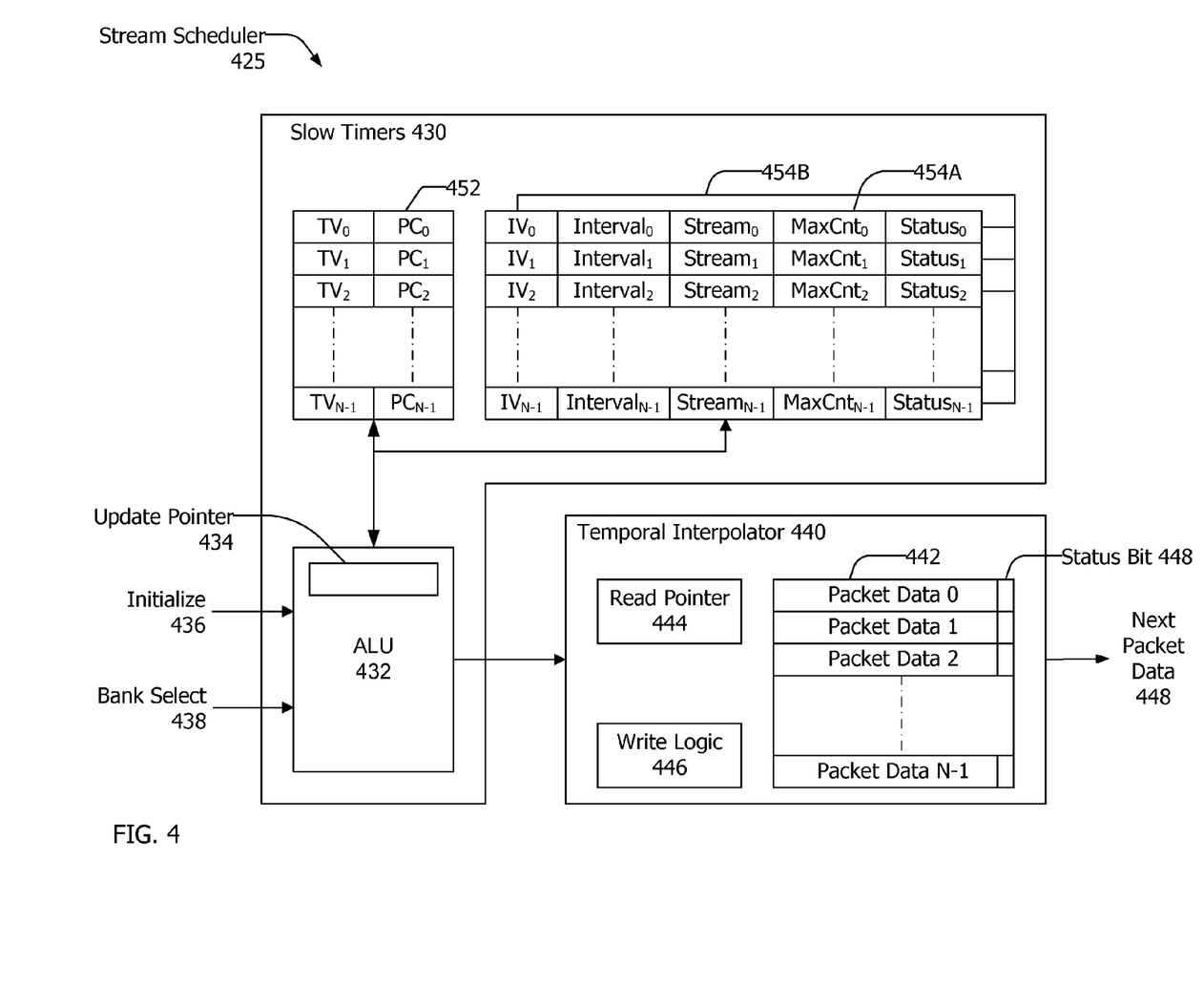
FIG. 4 is a block diagram of stream scheduler using a plurality of slow timers.

Referring now to FIG. 4, a stream scheduler 425, which may be suitable for the stream scheduler 325, may include a plurality of slow timers 430 and a temporal interpolator 440. The plurality of slow timers 430 may be effective to schedule packets in coarse, multiple-clock-cycle, time increments. The temporal interpolator 440 may then delay the output data from the plurality of slow timers 430 by selectable time intervals to essentially "fine tune" the position of each packet in time. Specifically, the plurality of slow timers may include N timers, each of which is updated in rotation every N clock cycles. The temporal interpolator 440 may then delay each output from the slow timers by a selectable time period from 1 to N clock periods.

The plurality of slow timers 430 may be implemented with an arithmetic logic unit (ALU) 432, a working memory 452, and two banks of control memory 454A, 454B. The working memory and the banks of control memory 454A, 454B may be portions of the memory 350. The ALU 432, in conjunction with the working memory 452, may operate as a plurality of independent count-down timers. In the example of FIG. 4, the number of timers is N, where N may be a binary number or other integer number. In typical fashion for digital circuits, the timers may be sequentially numbered from 0 to N−1. The data stored in the working memory 452 may include a present timer value ($TV_0$-$TV_{N-1}$) for each count-down timer and a count of the number of packets initiated by each timer ($PC_0$-$PC_{N-1}$).

The two control memories 454A, 454B may be used alternately, such that one control memory may be used by the slow timers 430 while the second control memory is being loaded with new or revised control data. The control memories 454A, 454B may be loaded by a processor such as the CPU 284 or another processor. The control memory used by the slow timers 430 may then be switched to reconfigure the operation of the slow timers 430 on the fly without interrupting the test traffic being generated. The ALU 432 may receive, from the CPU 284 or another source, a control memory bank select signal 438 indicating which of the two control memories 454A, 454B should be used by the slow timers 430.

The data stored in each control memory 454A, 454B may include, for each slow timer, a timer initial value ($IV_0$-$IV_{N-1}$), a timer interval ($Interval_0$-$Interval_{N-1}$), a stream number or other data to identify the stream associated with the timer ($Stream_0$-$Stream_{N-1}$), a maximum number of packets to be initiated by each timer ($MaxCnt_0$-$MaxCnt_{N-1}$), and status data ($Status_0$-$Status_{N-1}$). The initial value ($TV_1$-$IV_{N-1}$), the timer interval ($Interval_1$-$Interval_{N-1}$), and the present timer value ($TV_1$-$TV_{N-1}$) of each slow timer may be expressed in clock cycles and fractions of a clock cycle. The status data ($Status_0$-$Status_{N-1}$) may include a bit indicating if the stream associated with a timer is enabled, and a bit indicating if the associated timer should be re-initialized when the control memory select signal changes state. The status data ($Status_0$-$Status_{N-1}$) may include other information.

The ALU 432 may update the timer value (TV) and the packet count (PC) for one timer during each clock cycle in rotation, such that each of the timers is updated once every N clock cycles. The ALU 432 may include an update pointer 434 that designates one of the count-down timers to be updated. The update pointer may be incremented every clock cycle. Since each timer operates slowly with respect to the internal clock, the timers are referred to herein as "slow timers" as distinguished from typical count-down timers that decrement on every clock. Since a single ALU 432 services a plurality of N slow timers, the amount of logic circuits required may be substantially reduced compared to an alternative approach in which each timer is updated every clock cycle. The ALU 432 may also receive, from the CPU 284 or another source, an initialize signal 436.

The temporal interpolator 440 may be implemented with a circular buffer memory 442 having N memory slots, identified in FIG. 4 as Packet Data 0 to Packet Data N−1, for storing packet data. Although the number of memory slots in the circular buffer memory 442 is the same as the number of slow timers N, the slots in the circular buffer memory 442 are not associated with, or dedicated to, any specific timer. The temporal interpolator 440 may additionally include a read pointer 444 indicating which slot in the circular buffer memory 442 will be read out as the next packet data 448. The read pointer 444 may be incremented each clock such that the N slots in the circular buffer memory 442 are read in rotation, with each slot read once every N clocks. The temporal interpolator 440 may also include write logic 446 that determines where the ALU 432 should store packet data in the circular buffer memory 442.

When the ALU 432 determines, based on the timer value TV associated with the count-down timer designated by the update pointer 434, that a packet should be initiated, the ALU 432 may store packet data in a slot within the circular buffer memory 442 of the temporal interpolator 440. The packet data stored in the circular buffer memory 442 may include a stream number associated with the designated count-down timer and fractional bits of the associated timer value. The fractional bits may be used subsequently, for example within the network interface unit 280, to adjust the departure time of the packet to be formed. The packet data stored in the circular buffer memory 442 may include additional information.

Figure 5:
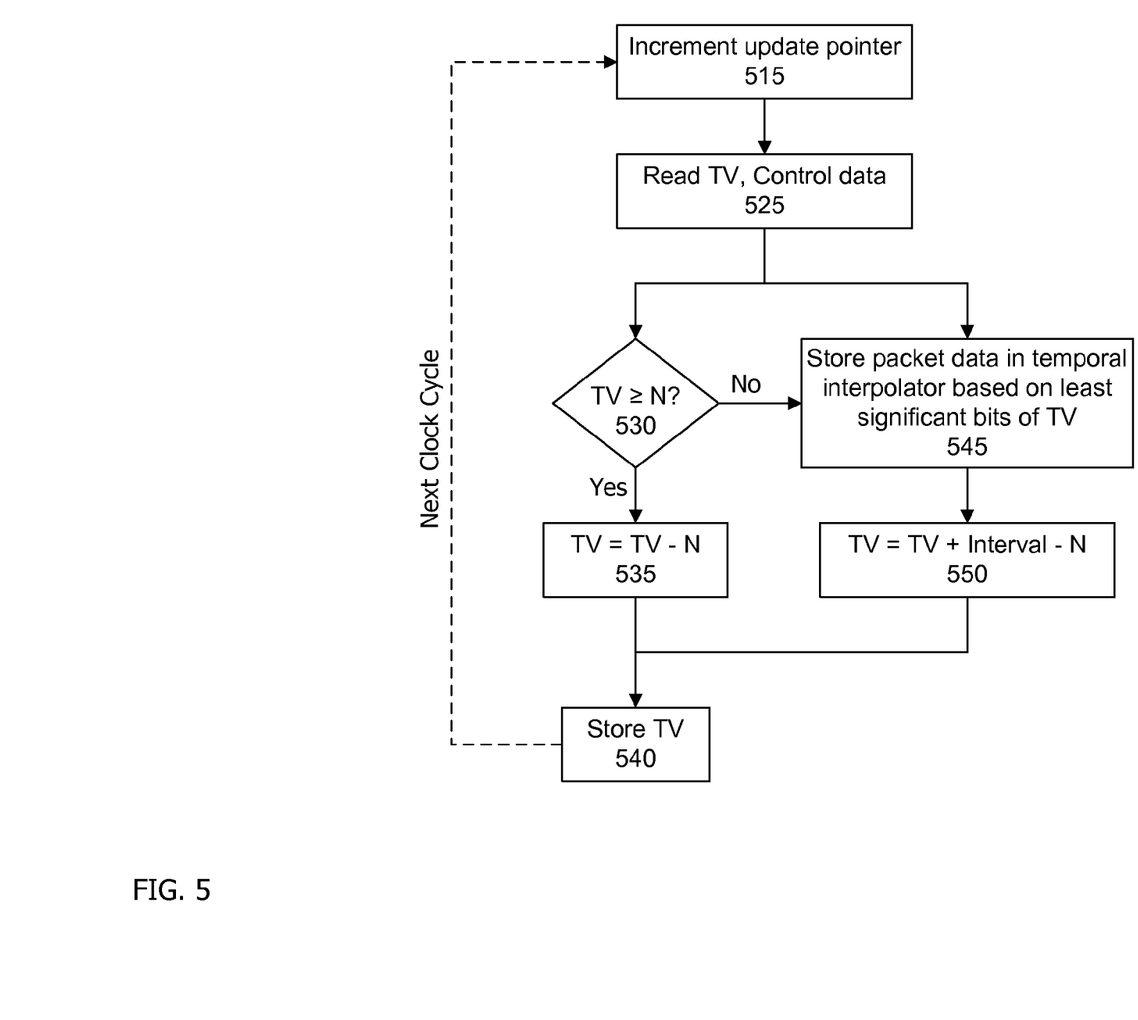
FIG. 5 is a flow diagram of logic for updating a plurality of timers.

The operation of the slow timers 430 may be understood by considering FIG. 5, which shows a diagram of the basic logical and arithmetic operations performed by the ALU 432. For ease of explanation, FIG. 5 shows the logical and arithmetic operations as a flow chart with a number of sequential actions. However, it must be understood that all of the logic and arithmetic operations shown in FIG. 5 may be performed within a single clock cycle and thus nearly concurrently.

At 515, the ALU 432 may increment the update pointer 434 to designate the next count-down timer to be updated. At 525, the ALU may read the timer value (TV) associated with the designated count-down timer from the working memory 452 and may read the control data associated with the designated count-down timer from the active one of the control memories 454A, 454B.

The timer value TV may indicate how many clock periods remain before a packet associated with the designated count-down timer should be initiated. TV may be defined in whole or fractional clocks. At 530, the ALU 432 may determine if TV is greater than or equal to N, the number of slow timers serviced by the ALU 432. If TV is greater than or equal to N, the ALU may determine that the designated count-down timer does not need to initiate formation of a packet during this update cycle, which is to say that the designated count-down timer will be updated at least once more before an associated packet must be initiated. In this case, at 535, the ALU may reduce TV by N and store the updated TV into the working memory 452 at 540. Note that, since TV is defined in clock periods and since the designated count-down timer is only updated every N clocks, TV may be reduced by N each time the designated count-down timer is updated. The process may then await the next clock to update the next count-down timer.

If, at 530, a determination is made that TV is less than N, the stream scheduler 425 should initiate a packet associated with the designated count-down timer within the next N clocks. Specifically, if TV has a value k, where k<N, a packet associated with designated count-down timer should be initiated, if possible, k clocks into the future. In this case, at 545, the ALU may write packet data associated with the designated count-down timer into the temporal interpolator 440 such that the packet data is delayed by k clocks before being output as the next stream data 448. When the temporal interpolator 440 is implemented by a circular buffer 442, the write logic 446 may add the value k onto the value of the read pointer 444 to determine where to write the packet data.

The packet data written by the ALU into the circular buffer 442 may include the stream number and some or all of the status bits associated with the designated count-down timer, both of which were read from the control memory 454A or 454B at 525. The packet data written by the ALU into the circular buffer 442 may also include the fractional bits of the timer value TV. The packet data written by the ALU into the circular buffer 442 may also include a least-significant portion of the packet count PC.

Each slot in the circular buffer 442 may have an associated status bit 448 that is cleared every time the slot is read and set by the write logic 446 when packet data is written to the slot. Thus the status bit 448 may indicate when the associated slot in the circular buffer 442 is full or empty. When the ALU attempts, at 545, to write packet data to a slot in the circular buffer 442 that is full, the write logic 446 may redirect the packet data to the closest available empty slot.

After packet data is written at 545, the ALU may update TV by subtracting N and adding the interval for the designated count-down timer, which was previously read from the control memory 454A or 454B at 525. The updated TV may be stored in the working memory 452 at 540, and the process may then await the next clock to update the next count-down timer.

Figure 6A:
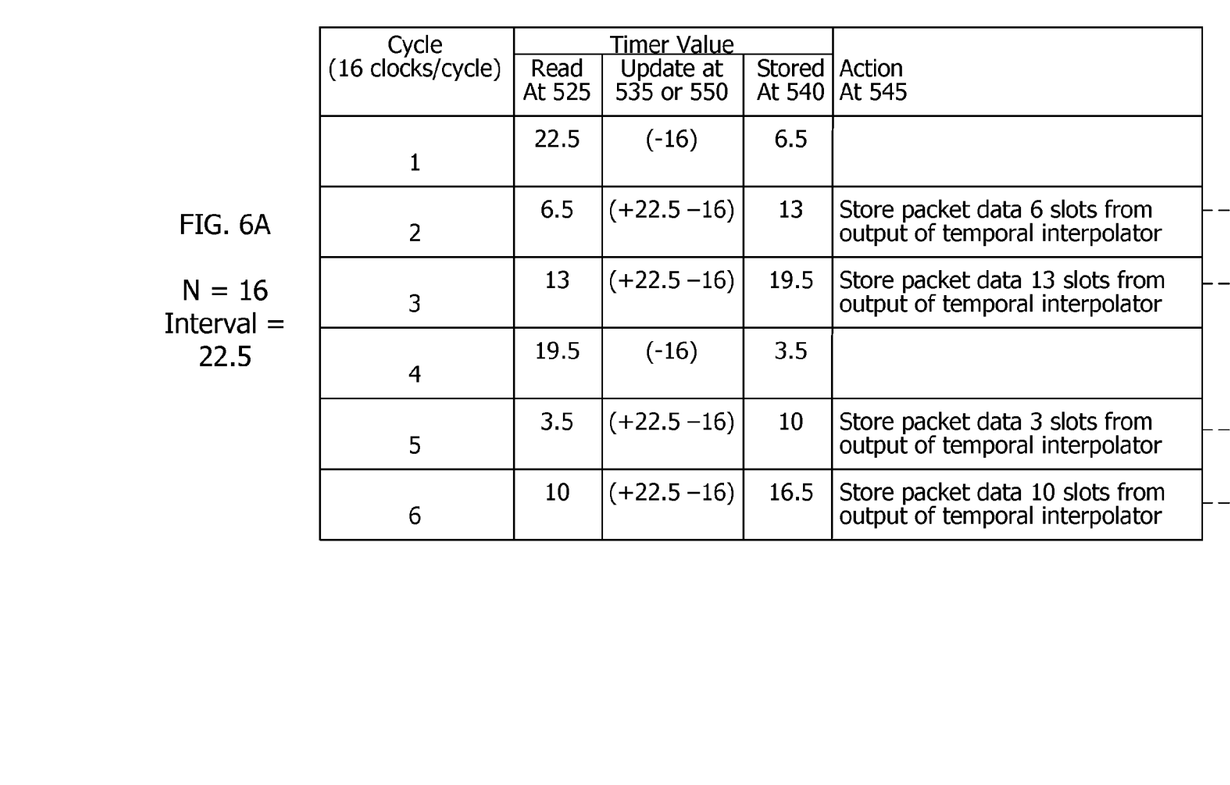
FIG. 6A is an example of the execution of the process of FIG. 5.

The operation of the stream scheduler 425 may be better understood through the examples of FIGS. 6A and 6B and FIGS. 7A and 7B. FIG. 6A is a table summarizing the operation of an exemplary count-down timer for 6 cycles through the update operation of FIG. 5. The exemplary count-down timer is one of sixteen count-down timers (N=16) and has a predetermined interval of 22.5 clocks. The columns of the table of FIG. 6A list, in order from left to right, the update cycle, the timer value read at 525 in FIG. 5, the values added to the timer value at 535 or 550, the updated timer value stored at 540, and the action taken at 545. For example, during the second update cycle, the timer value read at 525 is 6.5. Since 6.5 is less than 16 (N), packet data is stored in the temporal interpolator in a position 6 slots from the output such that the packet data will be delayed by six clock periods. The timer value is updated by adding 22.5 (the predetermined interval) and subtracting 16 (N), and the resulting value of 13 is stored at 540.

Figure 6B:
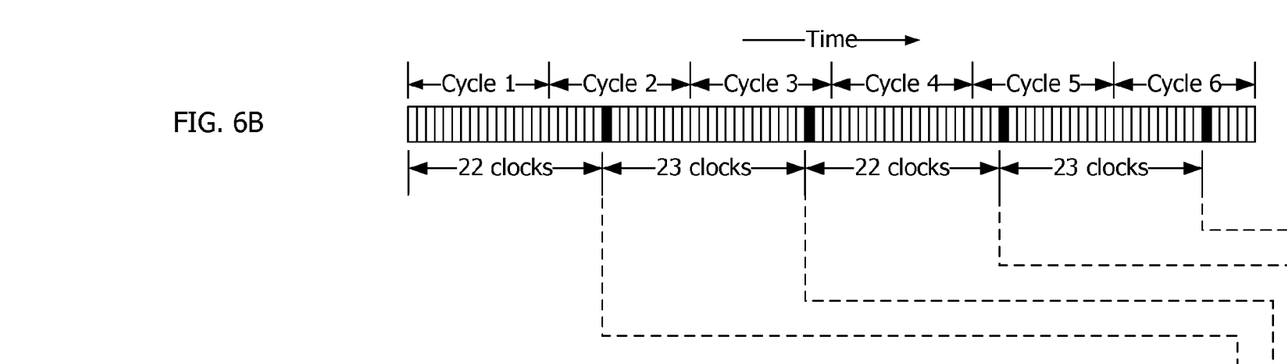
FIG. 6B is a timing diagram associated with the example of FIG. 6A.

FIG. 6B is a timing diagram of the data exiting the temporal interpolator 440 when a timer is operated as summarized in FIG. 6A. The sequence of packet data generated by the timer of FIG. 6A exits the temporal interpolator at alternating intervals of 22 clocks and 23 clocks. Thus the average interval between the packets initiated by the timer of FIG. 6A is the intended value of 22.5 clocks.

Figure 7A:
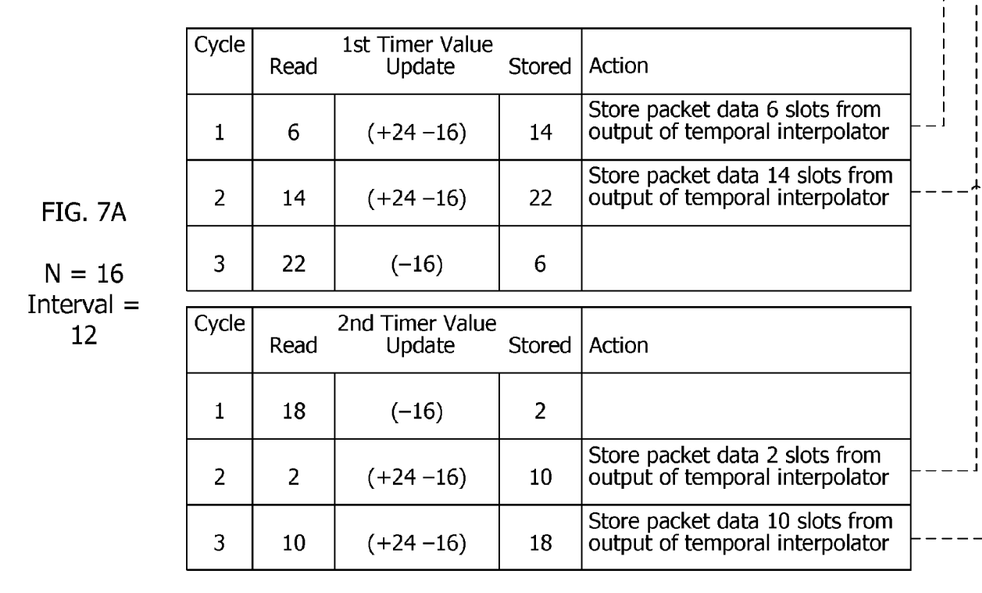
FIG. 7A is another example of the execution of the process of FIG. 5.

FIG. 7A is a table summarizing the operation of two exemplary count-down timers for 3 update cycles. Each exemplary count-down timer is one of sixteen count-down timers (N=16) and has a predetermined interval of 24 clocks. The two exemplary count-down timers are associated with the same stream and have been initialized such that the count values of the two count-down timers differ by 12. The columns of the table of FIG. 7A list, in order from left to right, the update cycle, the timer value read at 525 in FIG. 5, the values added to the timer value at 535 or 550, the updated timer value stored at 540, and the action taken at 545. For example, during the second update cycle, the first timer causes packet data to be stored in the temporal interpolator 440 14 slots from the output, such that the packet data will be delayed by 14 clock periods. During the second update cycle, the second timer causes packet data to be stored in the temporal interpolator 440 2 slots from the output, such that the packet data will be delayed by 2 clock periods.

Figure 7B:
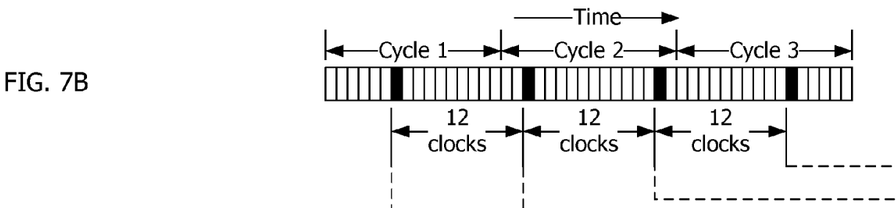
FIG. 7B is a timing diagram associated with the example of FIG. 7A.

FIG. 7B is a timing diagram of the data exiting the temporal interpolator 440 due to the two timers operated as summarized in FIG. 7A. The sequence of packet data generated by the timers of FIG. 7A exits the temporal interpolator at intervals of 12 clocks. The example of FIG. 7 illustrates the use of multiple slow count-down timers to schedule a single stream having inter-packet intervals less than N clocks. Two, three, four, or more slow count-down timers may be assigned, by way of the stream identifier associated with every count-down timer, to a single stream.

Figure 8:
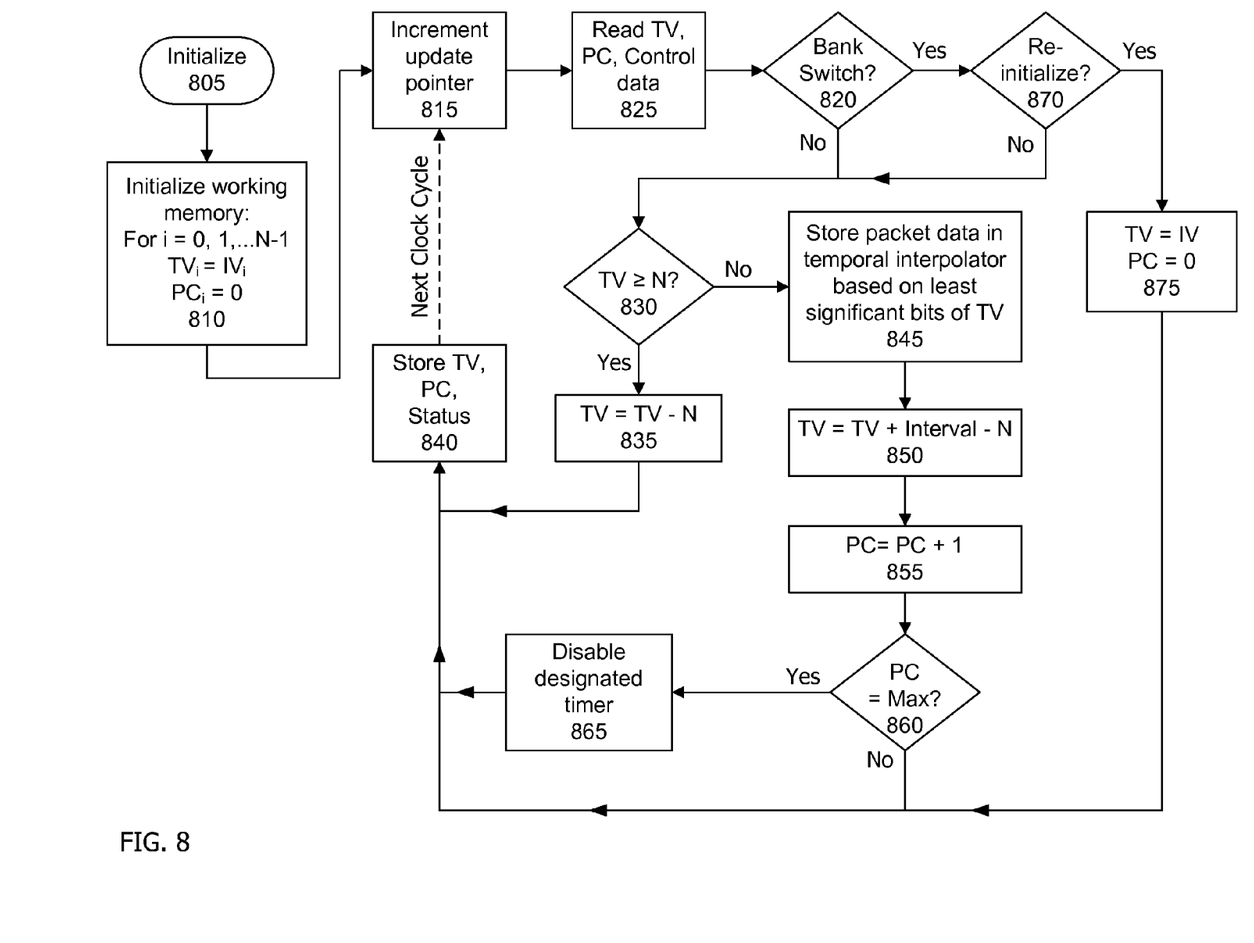
FIG. 8 is a flow diagram of logic for updating a plurality of timers.

The operation of the slow timers 430 may be further understood by considering FIG. 8, which shows a diagram of the basic and optional logical and arithmetic operations that may be performed by the ALU. For ease of explanation, FIG. 8 shows the logical and arithmetic operations as a flow chart with a number of sequential actions. However, all of the logic and arithmetic operations shown in FIG. 8 are performed within a single clock cycle and thus essentially concurrently.

The actions 815, 825, 830, 835, and 840 are essentially the same as the counterpart actions in FIG. 5 and will not be further described.

In response to an initialize signal received at 805, at 810 the ALU 432 may set the timer value (TV) for each of N count-down timers to the corresponding initial value (IV) read from the control memory 454A or 454B. Additionally, at 810 the ALU 432 may set a packet count (PC) for each of N count-down timers to zero.

After initialization, each of the plurality of count-down timers may be updated in rotation as previously described in conjunction with FIG. 5. In addition, when TV<N at 830 and packet data is output at 845, the packet count (PC) associated with the designated count-down timer may be incremented at 855. At 860, the incremented packet count may be compared to a maximum packet count (MaxCnt) associated with the designated count-down timer, which may have been read from the control memory 454A or 454B at 825. When the incremented packet count equals the maximum packet count, the designated count-down timer may be disabled, or inhibited from initiating any additional packets, at 865. The designated count-down timer may be disabled by setting an associated flag, which may be a portion of status information read at 825 and stored at 840.

Additionally, at 820, the ALU 432 may determine if a switch between two banks of control memory 454A, 454B has occurred since the designated count-down timer was previously updated. When a bank switch has not occurred, the process may proceed at 830 as previously described. When a bank switch has occurred, at 870 the ALU 432 may determine, from a portion of the status information for the designated count-down timer read at 825, if the designated count-down timer should be reinitialized. For example, the parameters, such as interval, initial value, and stream identifier of a count-down timer assigned to a continuing stream may not change when the control memory banks are switched. In this case, the designated count-down timer may not require initialization in response to the bank switch and the process may proceed at 830. In some cases, such as a count-down timer being re-assigned to a new stream or when the number of count-down timers assigned to a continuing stream is changed, the designated count-down timer may require initialization. In this case, the designated count-down timer may be re0initialized at 875 by setting the count value CV to the initial value read at 825 and by setting the packet count PC to zero.

Figure 9:
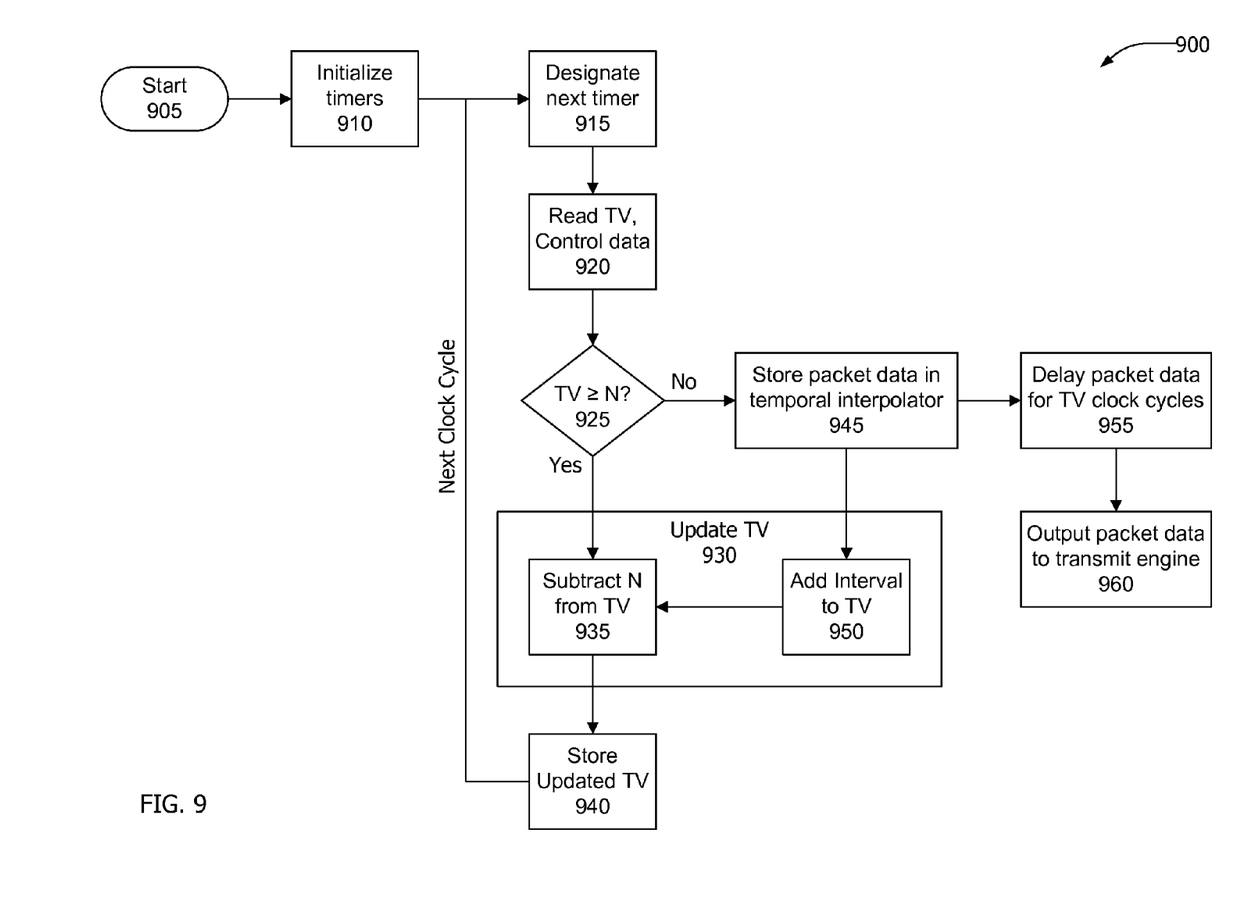
FIG. 9 is a flow diagram of a process for scheduling traffic.

Referring now to FIG. 9, a process 900 for scheduling traffic may start at 905 and continue until stopped (not shown in FIG. 9) by an operator action or until a large number of packets have been generated.

The start event at 905 may be, for example, the receipt of an initialize signal such as the initialize signal 436 in FIG. 4. At 910, each of a plurality of N count-down timers may be set to a respective predetermined initial value.

At 915, one of the N count-down timers may be designated to be updated. The count-down timer to be updated may be designated, for example, by an update pointer which is incremented each cycle of a clock, such that each count-down timer is designated in rotation every N cycles of the clock.

At 920, a timer value and control data associated with the designated count-down timer may be read from a memory.

At 925, a determination may be made from the timer value whether a packet should be formed. Specifically, when the timer value is less than N (the number of count-down timers), packet data defining a packet to be formed may be stored in a temporal interpolator at 945. The packet data may then be delayed, at 955, for a period based on the timer value before the packet data is output to a transmit engine that will form the packet. Specifically, the packet data may be delayed for a number of clock cycles equal to the timer value at the time the packet data was stored in the temporal interpolator at 945.

The timer value may be updated at 930. When a determination was made at 925 that the timer value was greater than or equal to N, the timer value may be updated at 935 by subtracting N from the timer value. When a determination was made at 925, the timer value was less than N, the timer value may be updating by adding a respective predetermined interval to the timer value at 950 and then subtracting N from the sum at 935. The net effect of the actions at 950 and 935 may be to increase the timer value by the difference between the respective interval and N.

The updated timer value may be stored in the memory 940, and the process may repeat from 915. The process 900 may repeat the actions from 915 to 940 once for each cycle of the clock.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A scheduler for a traffic generator, comprising:
   a working memory that stores N respective timer values for N count-down timers, where N is an integer greater than one;
   a control memory that stores control data associated with each count-down timer, the control data for each count-down timer including a respective interval and a respective stream identifier;
   an arithmetic and logic unit (ALU) that reads and updates each timer value in rotation every N cycles of a clock; and
   a temporal interpolator including a circular buffer memory, wherein
   when a timer value for a selected count-down timer of the N count-down timers is less than N, the ALU stores packet data associated with the selected count-down timer in the circular buffer memory, and the temporal interpolator delays the packet data by a delay period of 1 to N cycles of the clock based on the timer value.

2. The scheduler of claim 1, wherein the ALU comprises an update pointer to designate a timer value to be updated, and the ALU is configured:
   to read the designated timer value from the working memory in accordance with the update pointer,
   to update the designated timer value, and
   to store the updated designated timer value in the working memory in accordance with the update pointer.

3. The scheduler of claim 2, wherein the designated timer value is read, updated, and stored and the update pointer is incremented every cycle of the clock.

4. The scheduler of claim 2, wherein the ALU is further configured:
   when the designated timer value read from the working memory is greater than or equal to N, to update the designated timer value by subtracting N from the designated timer value; and
   when the designated timer value read from the working memory is less than N, to update the designated timer value by subtracting N and adding the respective interval to the designated timer value.

5. The scheduler of claim 4, wherein the packet data sent to the temporal interpolator includes:
   the respective stream identifier indicating a type of packet to be formed.

6. The scheduler of claim 4, wherein:
   the working memory stores N respective packet count values associated with the N count-down timers, and
   the ALU is further configured:
   to read the packet count value associated with the designated timer value; and
   when the designated timer value read from the memory is less than N and packet data is stored in the circular buffer memory, to increment the packet count value and store the incremented packet count value in the working memory.

7. The scheduler of claim 6, wherein:
   the control memory further stores a respective maximum packet count for each count-down timer
   the ALU is further configured:
   to compare the incremented packet count value with the respective maximum packet count, and
   to disable the designated count-down timer when the packet count value equals the maximum packet count.

8. The scheduler of claim 1, wherein
   the circular buffer memory include N delay slots for storing packet data from the ALU,
   the temporal interpolator comprises a read pointer indicating a delay slot to be read, and
   the read pointer is incremented each clock cycle such that the N delay slots are read in rotation every N clock cycles.

9. The schedule of claim 8, wherein the temporal interpolator further comprises:
   write logic that writes packet data output from the ALU into a delay slot determined by adding the timer value received from the ALU to the value of the read pointer.

10. The scheduler of claim 9, wherein:
    the circular buffer memory includes a status bit associated with each delay slot, each status bit indicating if the associated delay slot is full, and
    the write logic writes packet data output from the ALU into a best available delay slot if the delay slot determined by adding the timer value received from the ALU to the value of the read pointer is full.

11. The scheduler of claim 1, wherein:
    the control data stored in the control memory further includes a respective initial timer value for each count-down timer, and
    the ALU is further configured to set all of the timer values to the respective initial timer values upon receipt of an initialize signal.

12. The scheduler of claim 1, wherein:
    the control memory comprises two banks of control memory, and the ALU reads control data from one of the two banks of control memory in accordance with a bank select signal.

13. The scheduler of claim 1, further comprising:
a length generator to define a length of each packet to be generated; and
an overlay engine to provide content for each packet to be generated.

14. A traffic generator, comprising:
at least one stream scheduler, each stream scheduler comprising:
  a working memory that stores N respective timer values for N count-down timers, where N is an integer greater than one;
  a control memory that stores control data associated with each count-down timer, the control data for each count-down timer including a respective interval and a respective stream identifier;
  an arithmetic and logic unit (ALU) that reads and updates each timer value in rotation every N cycles of a clock; and
  a temporal interpolator including a circular buffer memory, wherein
  when a timer value for a selected count-down timer of the N count-down timers is less than N, the ALU stores packet data associated with the selected count-down timer in the circular buffer memory, and the temporal interpolator delays the packet data by a delay period of 1 to N cycles of the clock based on the timer value;
a length generator to define a packet length of each packet to be generated;
an overlay engine to provide content for each packet to be generated;
at least one transmit engine to compose packets based on delayed packet data from the temporal interpolator, packet lengths from the length generator, and content from the overlay engine; and
a network interface unit to transmit the packets composed by the transmit engine over a network.

15. The traffic generator of claim 14, wherein:
the at least one stream scheduler is a plurality of stream schedulers, and
the traffic generator further comprises an arbitrator to prioritize and order packet data output by the plurality of stream schedulers.

16. A scheduler for a traffic generator, comprising:
a working memory that stores N respective timer values for N count-down timers, where N is an integer greater than one;
an arithmetic and logic unit (ALU) that reads and updates each timer value in rotation every N cycles of a clock;
a circular buffer memory having N delay slots for storing packet data from the ALU; and
a read pointer indicating a delay slot to be read, the read pointer incremented each cycle of the clock such that the N delay slots are read in rotation every N clock cycles; wherein
when a timer value for a selected count-down timer of the N count-down timers is less than N, the ALU stores packet data associated with the selected count-down timer in the circular buffer memory, and the packet data is held in the circular buffer memory for a delay period of 1 to N cycles of the clock based on the timer value.

17. The scheduler of claim 16, further comprising:
write logic that writes packet data output from the ALU into a delay slot determined by adding the timer value received from the ALU to the value of the read pointer.

18. The scheduler of claim 17, wherein:
the circular buffer memory includes a status bit associated with each delay slot, each status bit indicating if the associated delay slot is full, and
the write logic writes packet data output from the ALU into a best available delay slot if the delay slot determined by adding the timer value received from the ALU to the value of the read pointer is full.

* * * * *